United States Patent
Battaiola Kreling et al.

(10) Patent No.: US 10,936,330 B2
(45) Date of Patent: Mar. 2, 2021

(54) INSTANTANEOUS BOOT OF VIRTUAL MACHINE INSTANCES VIA REMOTE DIRECT MEMORY ACCESS

(71) Applicant: International Business Machines Corporation, Armonk, NY (US)

(72) Inventors: Daniel Battaiola Kreling, Hortolandia (BR); Rafael Camarda Silva Folco, Santa Barbara d'Oeste (BR); Breno H. Leitao, Araraquara (BR); Mauro Sergio Martins Rodrigues, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 15/984,763

(22) Filed: May 21, 2018

(65) Prior Publication Data
US 2019/0354378 A1 Nov. 21, 2019

(51) Int. Cl.
*G06F 9/4401* (2018.01)
*G06F 9/455* (2018.01)
*G06F 15/173* (2006.01)

(52) U.S. Cl.
CPC ........ *G06F 9/4416* (2013.01); *G06F 9/45558* (2013.01); *G06F 15/17331* (2013.01); *G06F 2009/4557* (2013.01); *G06F 2009/45575* (2013.01); *G06F 2009/45595* (2013.01)

(58) Field of Classification Search
CPC .................................................... G06F 9/4416
See application file for complete search history.

(56) References Cited

U.S. PATENT DOCUMENTS

| 8,266,263 B2 | 9/2012 | Cain et al. |
| 9,015,268 B2 | 4/2015 | Swanson et al. |
| (Continued) | | |

FOREIGN PATENT DOCUMENTS

WO WO2016195624 A1 12/2016

OTHER PUBLICATIONS

Arblaster, "PXE booting servers on Brightbox cloud", andatche.com, Apr. 19, 2011, 8 pages. https://andatche.com/articles/2011/04/pxe-booting-servers-on-brightbox-cloud/.
(Continued)

*Primary Examiner* — Kim Huynh
*Assistant Examiner* — Eric Chang
(74) *Attorney, Agent, or Firm* — Yee & Associates, P.C.

(57) ABSTRACT

Booting a virtual machine instance using remote direct memory access is provided. In response to beginning to receive pages of a predetermined set of pages corresponding to a requested image of a virtual machine from an image provider server, a boot process of an instance of the virtual machine is commenced while the received pages are written directly into a random-access memory (RAM) disk. The received pages are read from the RAM disk during the boot process of the instance of the virtual machine until transfer of the predetermined set of pages corresponding to the requested image is complete. The predetermined set of pages corresponding to the requested image are written to a local hard disk drive from the memory releasing memory usage. In response to completing the boot process, a RAM image is switched to a local hard disk drive image.

20 Claims, 11 Drawing Sheets

(56) References Cited

U.S. PATENT DOCUMENTS

| | | | |
|---|---|---|---|
| 2005/0071623 A1* | 3/2005 | Goud | G06F 9/4416 |
| | | | 713/100 |
| 2011/0197052 A1 | 8/2011 | Green et al. | |
| 2012/0227037 A1 | 9/2012 | Chang | |
| 2014/0331309 A1 | 11/2014 | Spiers et al. | |
| 2016/0203000 A1 | 7/2016 | Parmar et al. | |
| 2017/0337070 A1* | 11/2017 | Lee | G06F 12/0868 |

OTHER PUBLICATIONS

"Preboot Execution Environment (PXE) Specification", Intel Corporation, Sep. 20, 1999, 103 pages. http://www.pix.net/software/pxeboot/archive/pxespec.pdf.

Levand, "Petitboot: A kexec based bootloader", Geoff Levand, accessed Apr. 10, 2018, 2 pages. https://mirrors.edge.kernel.org/pub/linux/kernel/people/geoff/petitboot/petitboot.html.

"Petitboot boot driver", OpenStack Ironic Team, accessed Apr. 10, 2018, 4 pages. https://specs.openstack.org/openstack/ironic-specs/specs/not-implemented/petitboot-boot-driver.html.

Mell et al., "The NIST Definition of Cloud Computing," National Institute of Standards and Technology Special Publication 800-145, Sep. 2011, 7 pages.

* cited by examiner

INSTANTANEOUS BOOT OF VIRTUAL MACHINE INSTANCES VIA REMOTE DIRECT MEMORY ACCESS

BACKGROUND

1. Field

The disclosure relates generally to virtual machines and more specifically to instantaneously booting a virtual machine instance on a host hypervisor server using remote direct memory access.

2. Description of the Related Art

The concept of virtual machines has been used in computing for decades. For example, mainframe computers take advantage of their computing power by running multiple instances of the same or different operating systems within multiple virtual machines on the same computer. A virtual machine is an emulation of a physical computer system. For example, virtual machines are based on computer architectures and provide the functionality of a physical computer. Virtual machines are desirable due to their ability to isolate specific applications, tasks, or users. Virtual machines are typically stored as a set of files.

A hypervisor or virtual machine monitor is computer software, firmware, or hardware that manages virtual machines. A physical computer on which a hypervisor runs a set of one or more virtual machines is called a host machine and each virtual machine is called a guest machine. The hypervisor presents guest operating systems with a virtual operating platform and controls the execution of the guest operating systems.

SUMMARY

According to one illustrative embodiment, a computer-implemented method for booting a virtual machine instance using remote direct memory access is provided. In response to a computer beginning to receive pages of a predetermined set of pages corresponding to a requested image of a virtual machine from an image provider server, the computer commences a boot process of an instance of the virtual machine while the computer writes the received pages directly into a random-access memory (RAM) disk on memory of the computer. The computer reads the received pages of the predetermined set of pages from the RAM disk during the boot process of the instance of the virtual machine until transfer of the predetermined set of pages corresponding to the requested image of the virtual machine is complete. The computer writes the predetermined set of pages corresponding to the requested image of the virtual machine to a local hard disk drive of the computer from the memory releasing memory usage. In response to the computer completing the boot process of the instance of the virtual machine, the computer switches from a RAM image to a local hard disk drive image. According to other illustrative embodiments, a computer system and computer program product for booting a virtual machine instance using remote direct memory access are provided.

DETAILED DESCRIPTION

Figure 1:
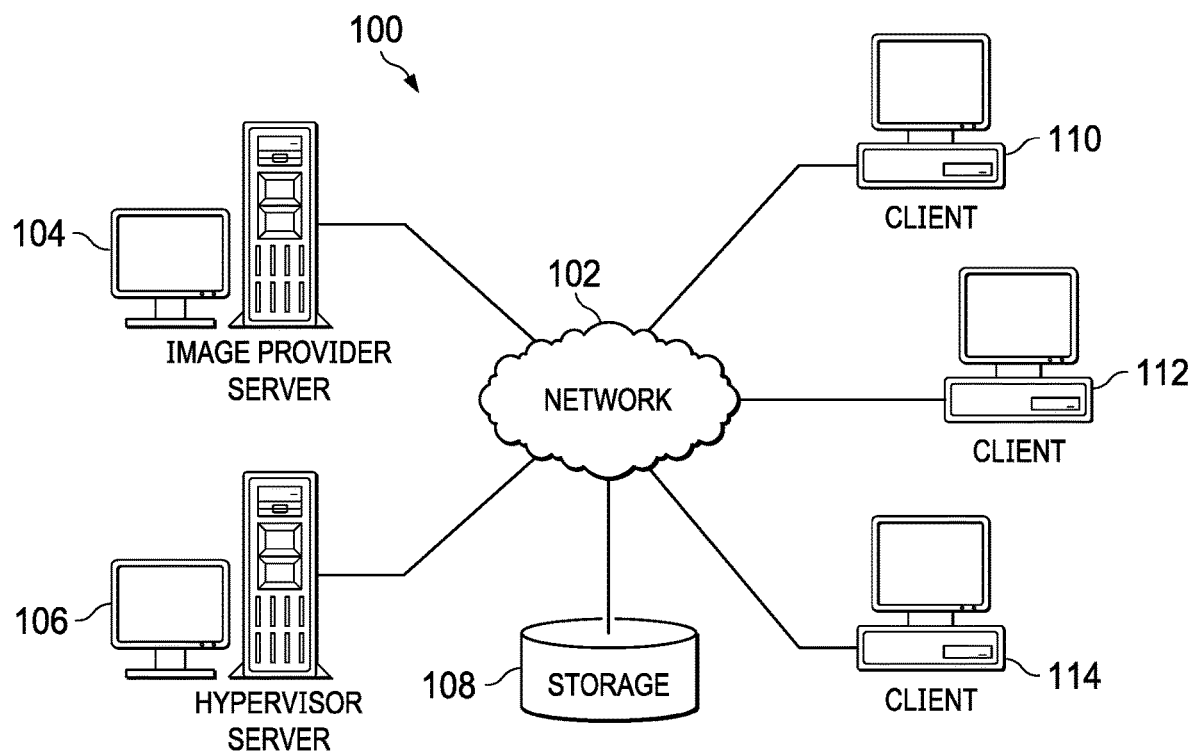
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 is an image provider server and server 106 is a hypervisor server. Image provider server 104 provides virtual machine images to requesting hypervisor servers, such as hypervisor server 106, using remote direct memory access (RDMA). RDMA is direct memory access from the memory of one computer, such as image provide server 104, into the memory of another computer, such as hypervisor server 106, without involving either computer's operating system (OS). RDMA permits high-throughput, low-latency networking. Hypervisor server 106 hosts one or more virtual machines, which provide one or more services, such as, for example, event monitoring services, problem ticket generation services, financial services, banking services, governmental services, educational services, reservation services, purchase transaction services, data services, and the like, to client devices. Also, it should be noted that image provider server 104 and hypervisor server 106 may each represent a set of one or more servers in a data center. Alternatively, image provider server 104 and hypervisor server 106 may represent computing nodes in a cloud environment.

Client 110, client 112, and client 114 also connect to network 102. Clients 110, 112, and 114 are clients of hypervisor server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart appliances, gaming devices, kiosks, and the like.

Storage 108 is a network storage device capable of storing any type of data in a structured format or an unstructured format. In addition, storage 108 may represent a plurality of network storage devices. Further, storage 108 may store identifiers and network addresses for a plurality of hypervisor servers, a plurality of different virtual machine images, and the like. Furthermore, storage unit 108 may store other types of data, such as authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on hypervisor server 106 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
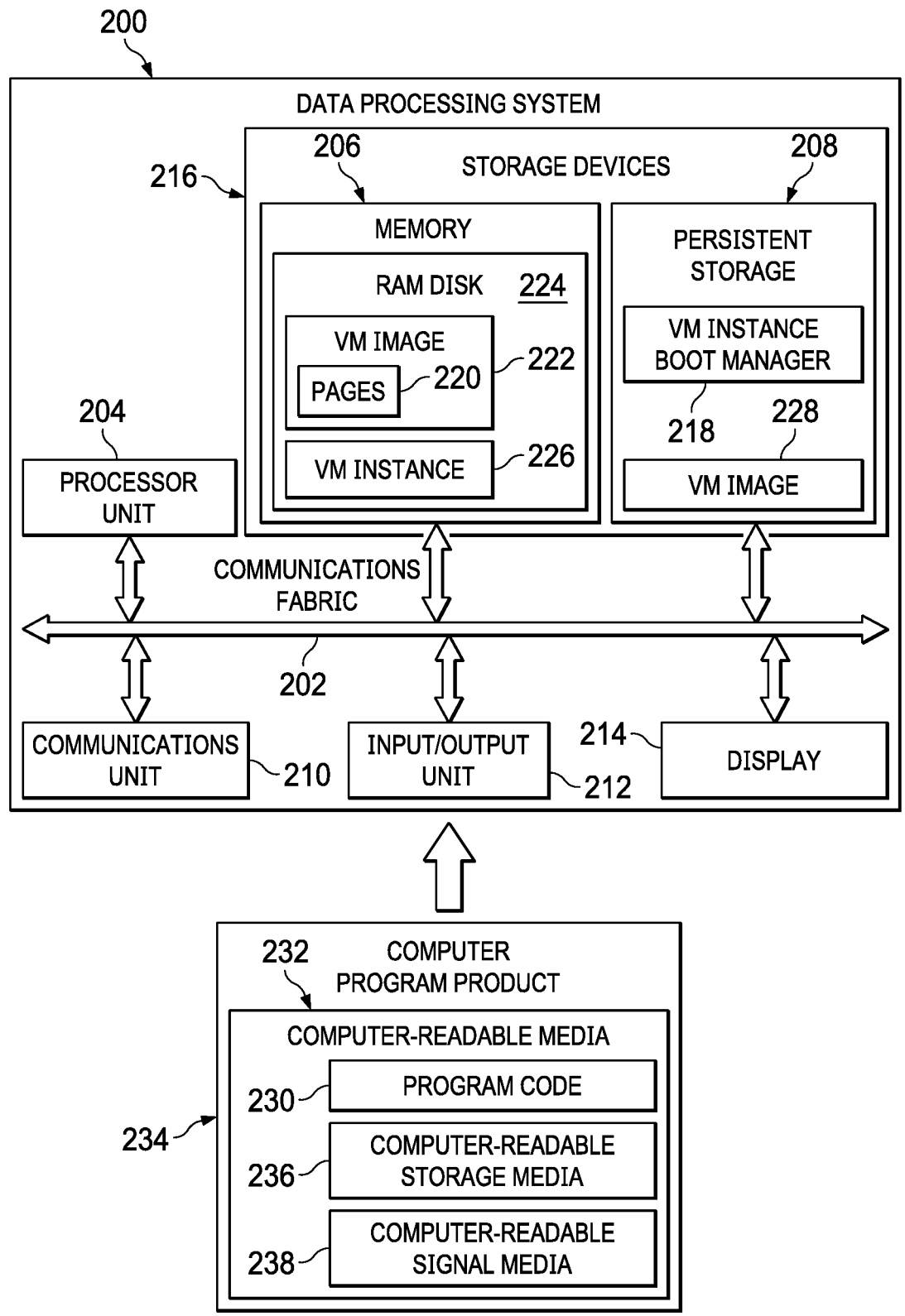
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as hypervisor server 106 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores virtual machine instance boot manager 218. However, it should be noted that even though virtual machine instance boot manager 218 is illustrated as residing in persistent storage 208, in an alternative illustrative embodiment virtual machine instance boot manager 218 may be a separate component of data processing system 200. For example, virtual machine instance boot manager 218 may be a hardware component coupled to communication fabric 202 or a combination of hardware and software components. In another alternative illustrative embodiment, a first portion of virtual machine instance boot manager 218 may be located in data processing system 200 and a second portion of virtual machine instance boot manager 218 may be located in a second data processing system, such as, for example, image provider server 104 in FIG. 1.

Virtual machine instance boot manager 218 controls the process of instantaneous boot of an instance of a virtual machine instance on data processing system 200. Virtual machine instance boot manager 218 writes pages 220 of virtual machine image 222 into RAM disk 224 of memory 206 as pages 220 are received by data processing system 200 from the image provider server via RDMA. Pages 220 represent blocks of pages of a predetermined set of pages corresponding to virtual machine image 222. Virtual machine image 222 represents a data file for generating a virtual machine instance, such as virtual machine instance 226.

Virtual machine instance 226 represents a running instance of the virtual machine on data processing system 200. Virtual machine instance boot manager 218 immediately starts to boot virtual machine instance 226 as soon as a first block of pages 220 is received in RAM disk 224. RAM disk 224 represents a section or portion of memory 206 that is dedicated to temporarily storing pages 220 of virtual machine image 222 until all of pages 222 are received and the boot of virtual machine instance 226 is complete. In other words, virtual machine instance boot manager 218 treats RAM disk 224 as a separate RAM drive for faster access. Once the boot of virtual machine instance 226 is complete, virtual machine instance boot manager 218 copies virtual machine image 228 into persistent storage 208 and destroys virtual RAM disk 224 in memory 206. Virtual machine image 228 represents a complete copy, which includes all of the predetermined set of pages, of virtual machine image 222.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 230 is located in a functional form on computer readable media 232 that is selectively removable and may be loaded onto or transferred to data processing system 200 for running by processor unit 204. Program code 230 and computer readable media 232 form computer program product 234. In one example, computer readable media 232 may be computer readable storage media 236 or computer readable signal media 238. Computer readable storage media 236 may include, for example, an optical or magnetic disc that is inserted or placed into a drive or other device that is part of persistent storage 208 for transfer onto a storage device, such as a hard drive, that is part of persistent storage 208. Computer readable storage media 236 also may take the form of a persistent storage, such as a hard drive, a thumb drive, or a flash memory that is connected to data processing system 200. In some instances, computer readable storage media 236 may not be removable from data processing system 200.

Alternatively, program code 230 may be transferred to data processing system 200 using computer readable signal media 238. Computer readable signal media 238 may be, for example, a propagated data signal containing program code 230. For example, computer readable signal media 238 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 230 may be downloaded over a network to persistent storage 208 from another device or data processing system through computer readable signal media 238 for use within data processing system 200. For instance, program code stored in a computer readable storage media in a data processing system may be downloaded over a network from the data processing system to data processing system 200. The data processing system providing program code 230 may be a server computer, a client computer, or some other device capable of storing and transmitting program code 230.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 236 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
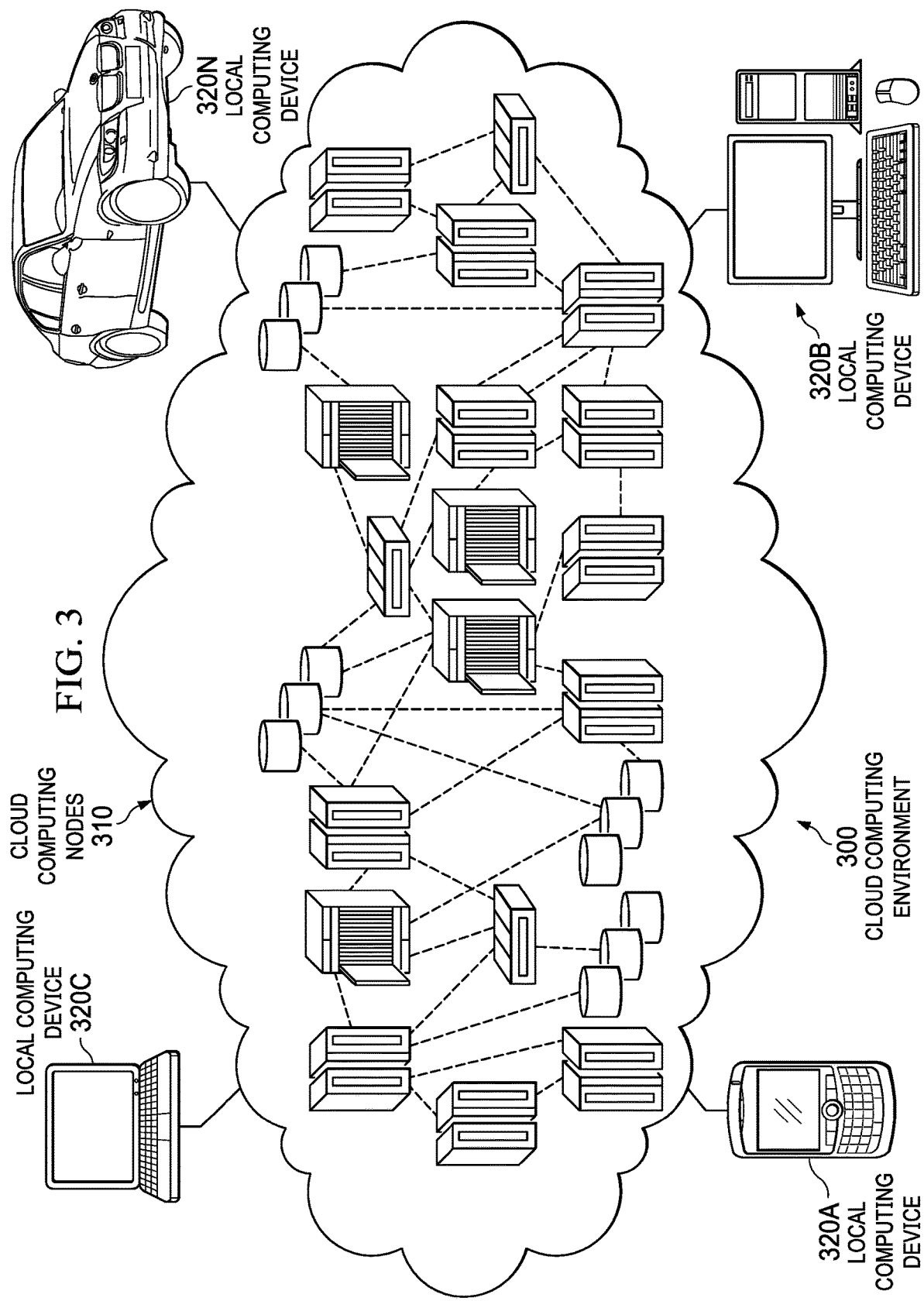
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, image provider server 104 and hypervisor server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
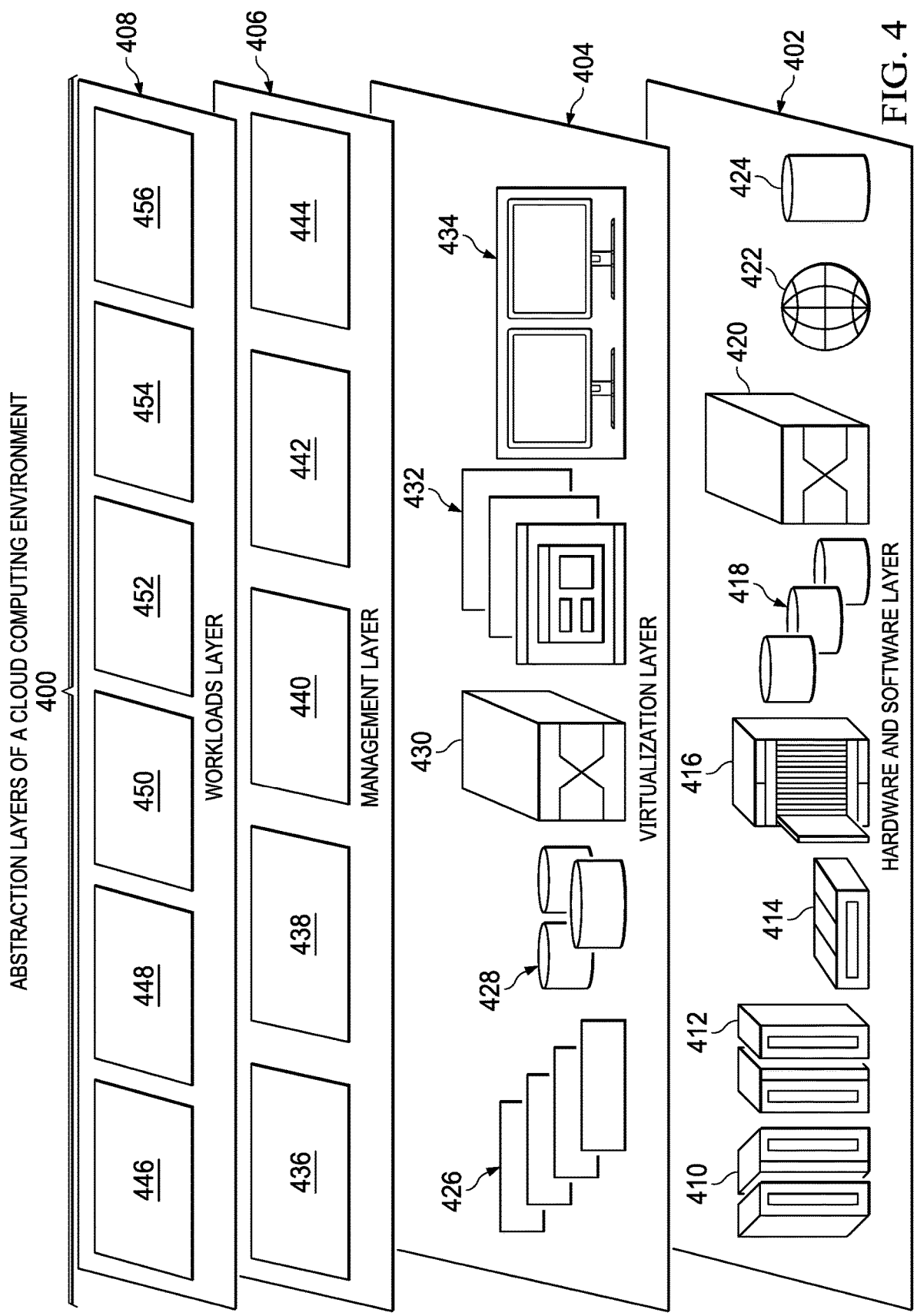
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and virtual machine instance boot via RDMA management 456.

Currently, the boot process of a virtual machine instance is not efficient, especially when the target host computer does not have an image of the virtual machine pre-cached in local hard disk or memory. In general, to create a virtual machine instance in a remote cloud server, the virtual machine image needs to be downloaded from storage via a network to the remote cloud server, and the remote cloud server only starts booting the virtual machine instance when the virtual machine image is fully transferred to the remote cloud server. A bottleneck to the transfer may be in, for example, I/O, bus, OS stack, and/or the network.

High-performance devices may be used to increase network and I/O bandwidth, such as solid-state disks, RDMA-based network adapters, and the like. However, using these high-performance devices with traditional methods is not enough to instantaneously create a virtual machine instance in a remote cloud server because I/O is still a bottleneck to virtual machine image transfer. Therefore, illustrative embodiments take into account and address a need for booting virtual machine instances instantaneously in a remote cloud server as soon as the virtual machine instance is created, without any delays waiting for the entire virtual machine image to be fully downloaded.

Currently, a virtual machine instance may have a 30-40 second delay to boot the first time in an OpenStack cloud if the image of the virtual machine is not pre-cached in the target host computer and the system is not tuned. In addition, other factors also contribute to this delay, such as 1 Gb network interface cards, spinning hard disks, non-compressed virtual machine images, and the like.

In contrast, illustrative embodiments instantaneously generate virtual machine instances in a cloud environment. In other words, illustrative embodiments immediately start booting a virtual machine instance, that is, without delay in creation of the virtual machine instance. A user does not need to wait for the image of the virtual machine to be fully downloaded before seeing a result of the virtual machine instance starting. Illustrative embodiments implement a new network protocol for transferring a virtual machine image via RDMA directly to a RAM disk on a target host computer from an image provider server and booting the virtual machine instance from the RAM disk on the target host computer as soon as initial pages of the virtual machine image are received.

Further, illustrative embodiments provide novel differences from traditional methods, such as pre-boot execution environment (PXE) and petitboot. For example, illustrative embodiments utilize a novel transparent network protocol, which is applicable for any virtual machine image and is network architecture independent. In addition, illustrative embodiments directly transfer pages corresponding to a virtual machine image from an image provider server's memory to a requesting hypervisor server's memory, bypassing the operating system stack on both servers. Furthermore, illustrative embodiments boot virtual machine instances directly from memory (e.g., RAM disk) and do not boot virtual machine instances from a network interface card. Moreover, illustrative embodiments automatically transfer the virtual machine image from the RAM disk to local hard disk drive on the hypervisor server after the virtual machine image is fully transferred to the hypervisor server. Illustrative embodiments perform the transfer by soft-migration, which is invisible to the user.

As soon as received memory pages corresponding to a virtual machine image are written into the hypervisor server's memory, illustrative embodiments start booting the virtual machine instance using pages received up to that point. Illustrative embodiments read pages of the virtual machine image from RAM disk until the virtual machine image is fully transferred.

Since blocks of pages are not necessarily transferred sequentially, illustrative embodiments may request to receive "high priority" blocks of pages first so the hypervisor server can continue the boot process of the virtual machine instance. However, if the virtual machine instance needs a set of one or more high priority blocks of pages that have not been received yet, illustrative embodiments may halt or freeze the virtual machine instance boot process until the set of high priority blocks of pages are received.

Illustrative embodiments write received pages directly into the requesting hypervisor server's memory, bypassing the operating system stack and I/O bus of the hypervisor server. Upon receipt of all remaining blocks of pages corresponding to the virtual machine image from the image provider server, illustrative embodiments write the virtual machine image to a local hard disk drive on the hypervisor server, so the virtual machine image is persisted on the local hard disk drive, thereby releasing memory usage. After the boot of the virtual machine instance is complete, illustrative embodiments switch the virtual machine instance from RAM disk (i.e., memory) to local hard disk (i.e., persistent storage). This switching process is a soft-migration, which transparently switches the virtual machine instance from a RAM disk image to a local hard disk drive image, without the user realizing the transition from RAM disk to local hard disk drive. The soft-migration process is similar to live-migration, but is much simpler and faster since the source RAM disk and target hard disk drive are in the same server computer, which uses the same devices, such as central processor unit (CPU) and memory, and the virtual machine image is the same. The only thing that changes is at the backend (i.e., RAM disk during boot, local hard disk drive after boot). Moreover, illustrative embodiments may destroy or delete the RAM disk image, releasing memory space and increasing hypervisor server performance.

It should be noted that, depending on the type of virtual machine image, illustrative embodiments may perform an inspection of the virtual machine image to determine the data blocks where the bootable bits are located using, for example, a PReP boot partition, a unified extensible firmware interface, and the like. This inspection improves performance of the boot process so the host server computer can start booting faster. For QCOW2 images, illustrative embodiments may mark the bootable bits in header fields to point to the data blocks of the virtual machine image. QCOW is a file format for image files used by Quick Emulator (QEMU), which is a free and open-source hosted virtual machine monitor (i.e., hypervisor) that performs hardware virtualization.

Figure 5:
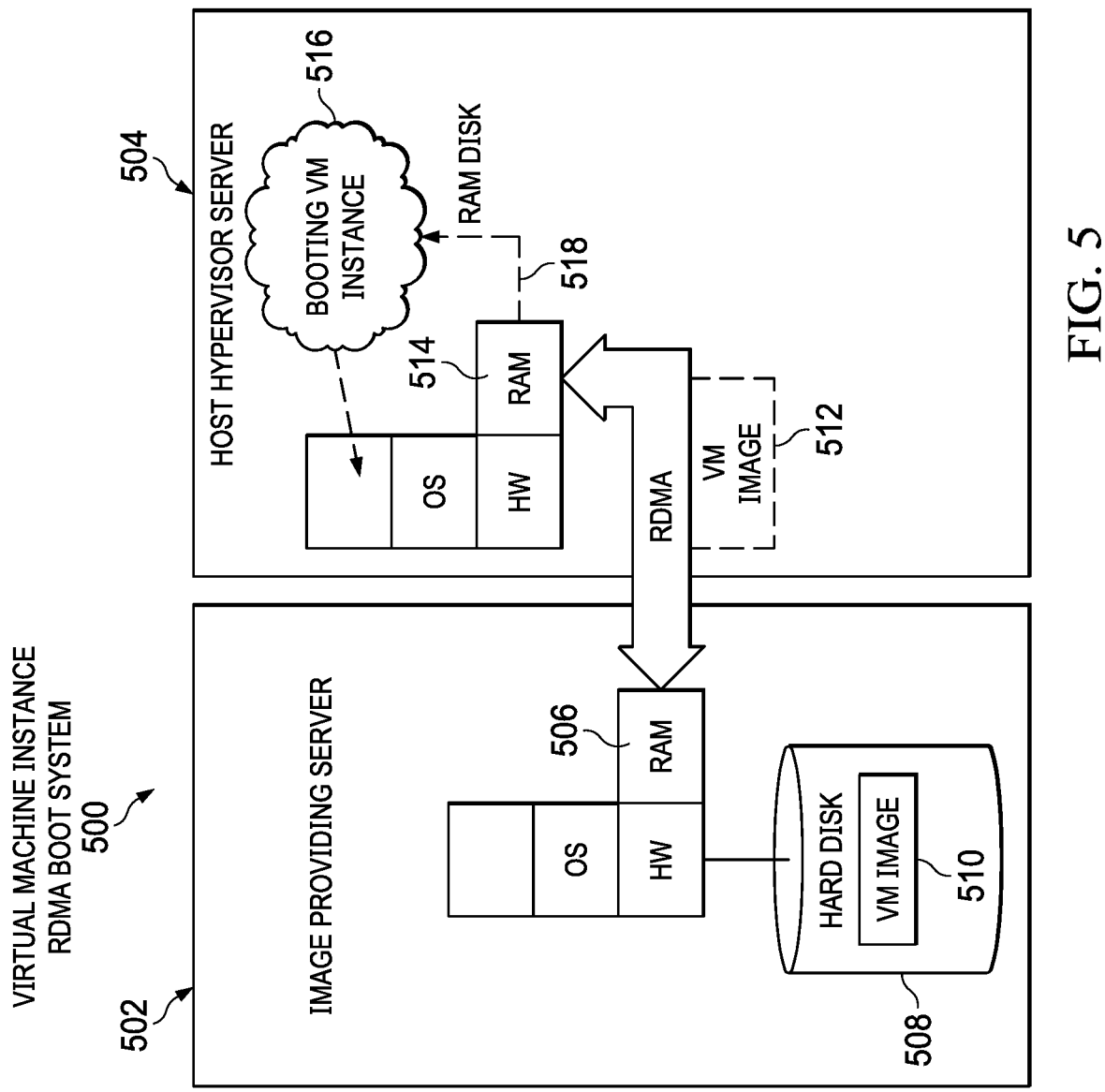
FIG. 5 is a diagram illustrating an example of a virtual machine instance remote direct memory access (RDMA) boot system in accordance with an illustrative embodiment.

With reference now to FIG. 5, a diagram illustrating an example of a virtual machine instance RDMA boot system is depicted in accordance with an illustrative embodiment. Virtual machine instance RDMA boot system 500 may be implemented in a network of data processing systems, such as network data processing system 100 in FIG. 1, or a cloud computing environment, such as cloud computing environment 300 in FIG. 3. Virtual machine instance RDMA boot system 500 is a system of hardware and software components for instantaneously booting a virtual machine instance on a host hypervisor server using RDMA.

In this example, virtual machine instance RDMA boot system 500 includes image provider server 502 and host hypervisor server 504. However, it should be noted that virtual machine instance RDMA boot system 500 may include any number of servers and other data processing systems not shown. Image provider server 502 may be, for example, image provider server 104 in FIG. 1 or a cloud computing node in cloud computing nodes 310 in FIG. 3. Host hypervisor server 504 may be, for example, hosts hypervisor server 106 in FIG. 1, data processing system 200 in FIG. 2, or another cloud computing node in cloud computing nodes 310 in FIG. 3.

Image provider server 502 includes RAM 506 and hard disk 508. Upon receiving a request for virtual machine image 510 from host hypervisor server 504, image provider server 502 retrieves virtual machine image 510 from hard disk 508 and places virtual machine image 510 in RAM 506. Image provider server 502 then utilizes RDMA to send virtual machine image 512, which is the same as, or substantially the same as, virtual machine image 510, to RAM 514 of host hypervisor server 504. Host hypervisor server 504 immediately starts to boot virtual machine instance 516 from RAM disk 518 of RAM 514 as soon as the first block or blocks of pages corresponding to virtual machine image 512 are received in RAM disk 518.

Figure 6:
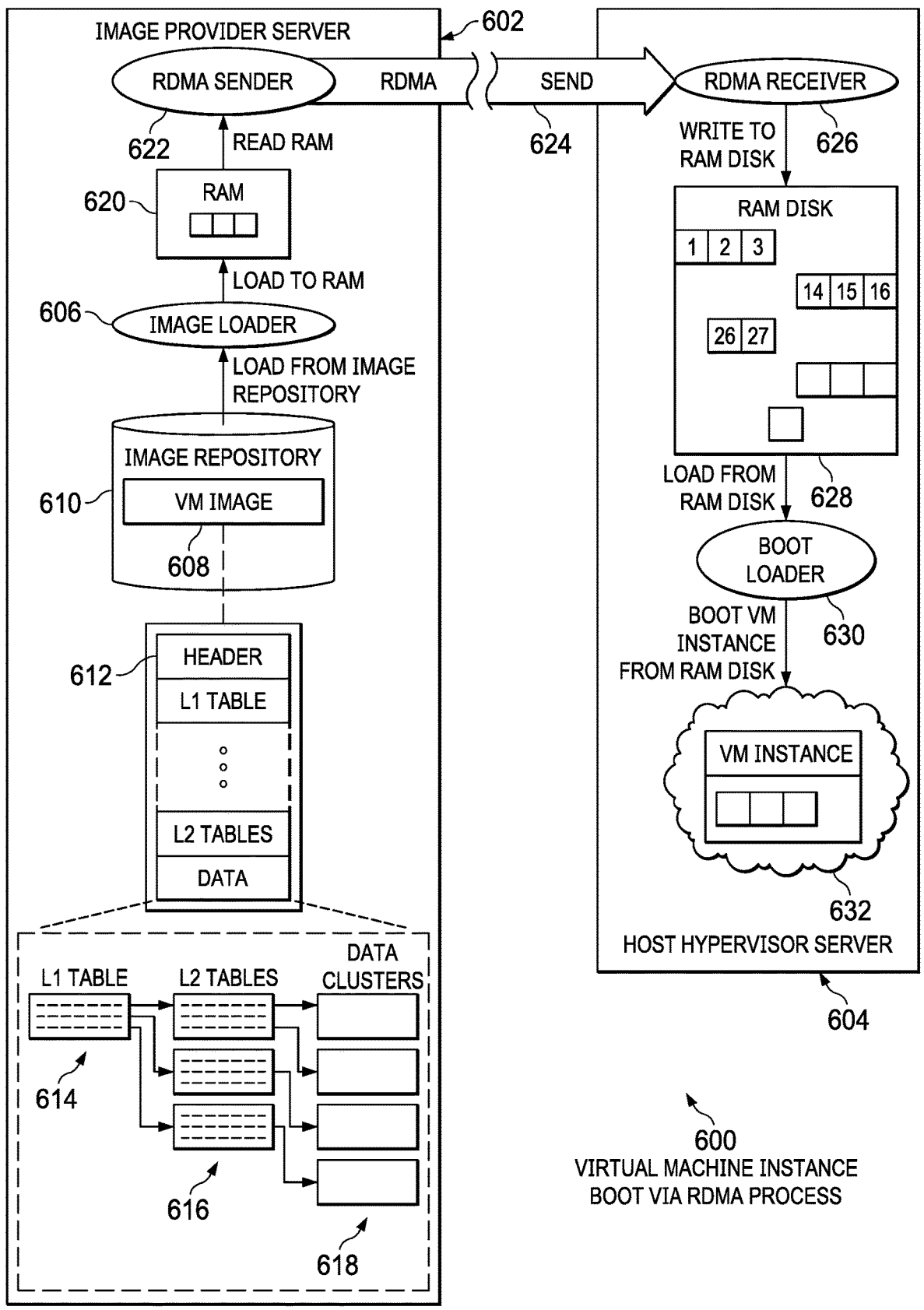
FIG. 6 is a diagram illustrating an example of a virtual machine instance boot via RDMA process in accordance with an illustrative embodiment.

With reference now to FIG. 6, a diagram illustrating an example of a virtual machine instance boot via RDMA process is depicted in accordance with an illustrative embodiment. In this example, virtual machine instance boot via RDMA process 600 utilizes image provider server 602 and host hypervisor server 604 to instantaneously boot a virtual machine instance on host hypervisor server 604 using RDMA. Image provider server 602 utilizes image loader 606 to load virtual machine image 608 from image repository 610 in response to image provider server 602 receiving a request from host hypervisor server 604 for virtual machine image 608. In this example, virtual machine image 608 includes header 612, L1 table 614, L2 tables 616, and data clusters 618. However, it should be noted that virtual machine image 608 is only intended as an example and not as a limitation on different illustrative embodiments. In other words, virtual machine image 608 may include more or less information than shown.

Image loader 606 loads virtual machine image 608 to RAM 620 of image provider server 602. RDMA sender 622 reads virtual machine image 608 from RAM 620 and sends virtual machine image 608 as blocks of pages to host hypervisor server 606 via a network using RDMA at 624. Host hypervisor server 606 utilizes RDMA receiver 626 to receive the blocks of pages corresponding to virtual machine image 608 and writes each block of pages as it is received via RDMA into RAM disk 628 of host hypervisor server 604. As shown in this example, blocks of pages may not be received sequentially. Host hypervisor server 606 utilizes boot loader 630 to load from RAM disk 628 each block of pages as soon as each block of pages is received and immediately starts booting virtual machine instance 632 using the blocks of pages already received without waiting for all blocks of pages to be received via RDMA from image provider server 602.

Figure 7:
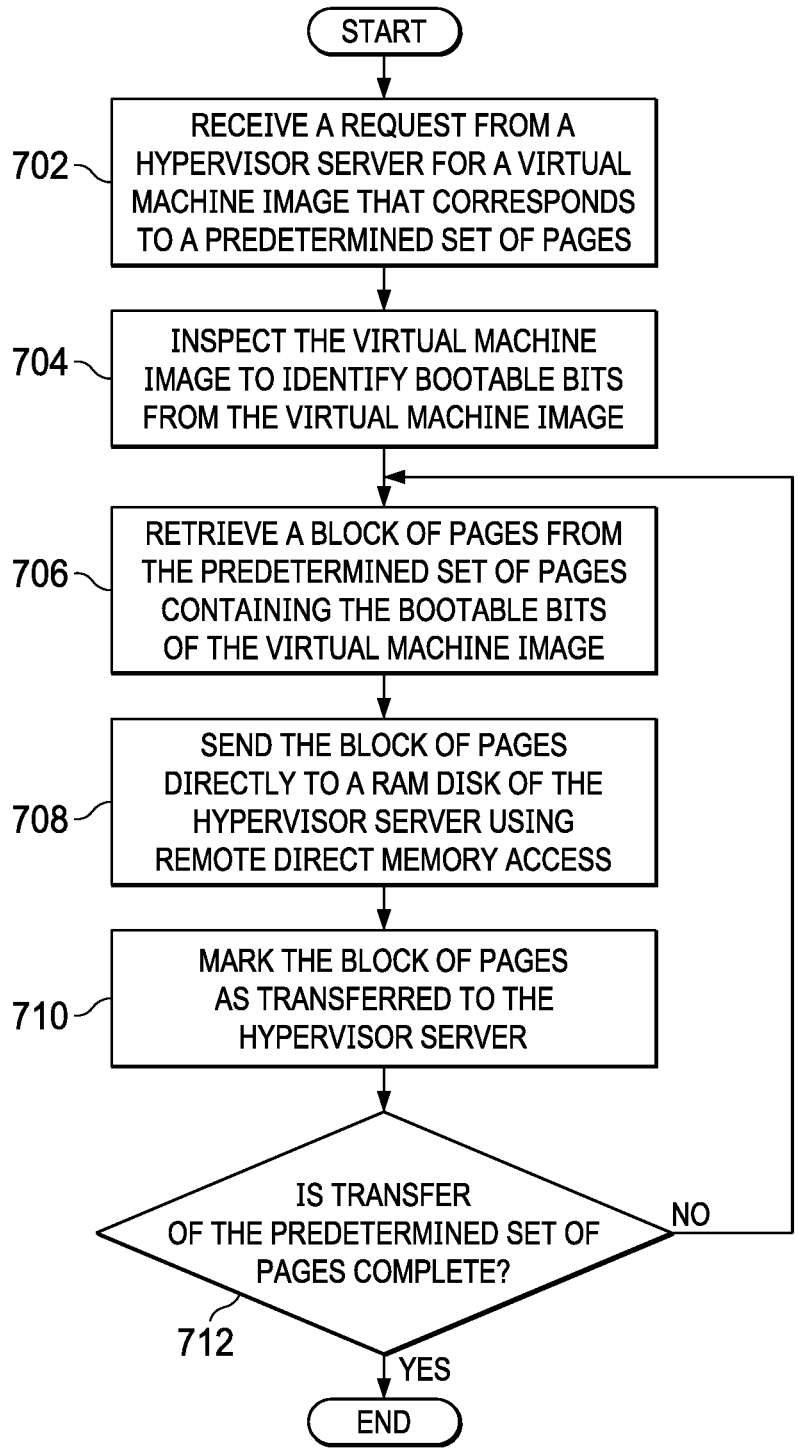
FIG. 7 is a flowchart illustrating a process for transferring a virtual machine image from an image provider server in accordance with an illustrative embodiment.

With reference now to FIG. 7, a flowchart illustrating a process for transferring a virtual machine image from an image provider server is shown in accordance with an illustrative embodiment. The process shown in FIG. 7 may be implemented in a computer, such as, for example, image provider server 104 in FIG. 1.

The process begins when the computer receives a request from a hypervisor server, such as, for example, hypervisor server 106 in FIG. 1, for a virtual machine image that corresponds to a predetermined set of pages (step 702). The computer inspects the virtual machine image to identify bootable bits from the virtual machine image (step 704). Afterward, the computer retrieves a block of pages from the predetermined set of pages containing the bootable bits of the virtual machine image (step 706).

The computer sends the block of pages directly to a RAM disk of the hypervisor server using remote direct memory access (step 708). In addition, the computer marks the block of pages as transferred to the hypervisor server (step 710). Then, the computer makes a determination as to whether transfer of the predetermined set of pages is complete (step 712). If the computer determines that the transfer of the predetermined set of pages is not complete, no output of step 712, then the process returns to step 706 where the computer retrieves another block of pages to send to the hypervisor server. If the computer determines that the transfer of the predetermined set of pages is complete, yes output of step 712, then the process terminates thereafter.

Figure 8:
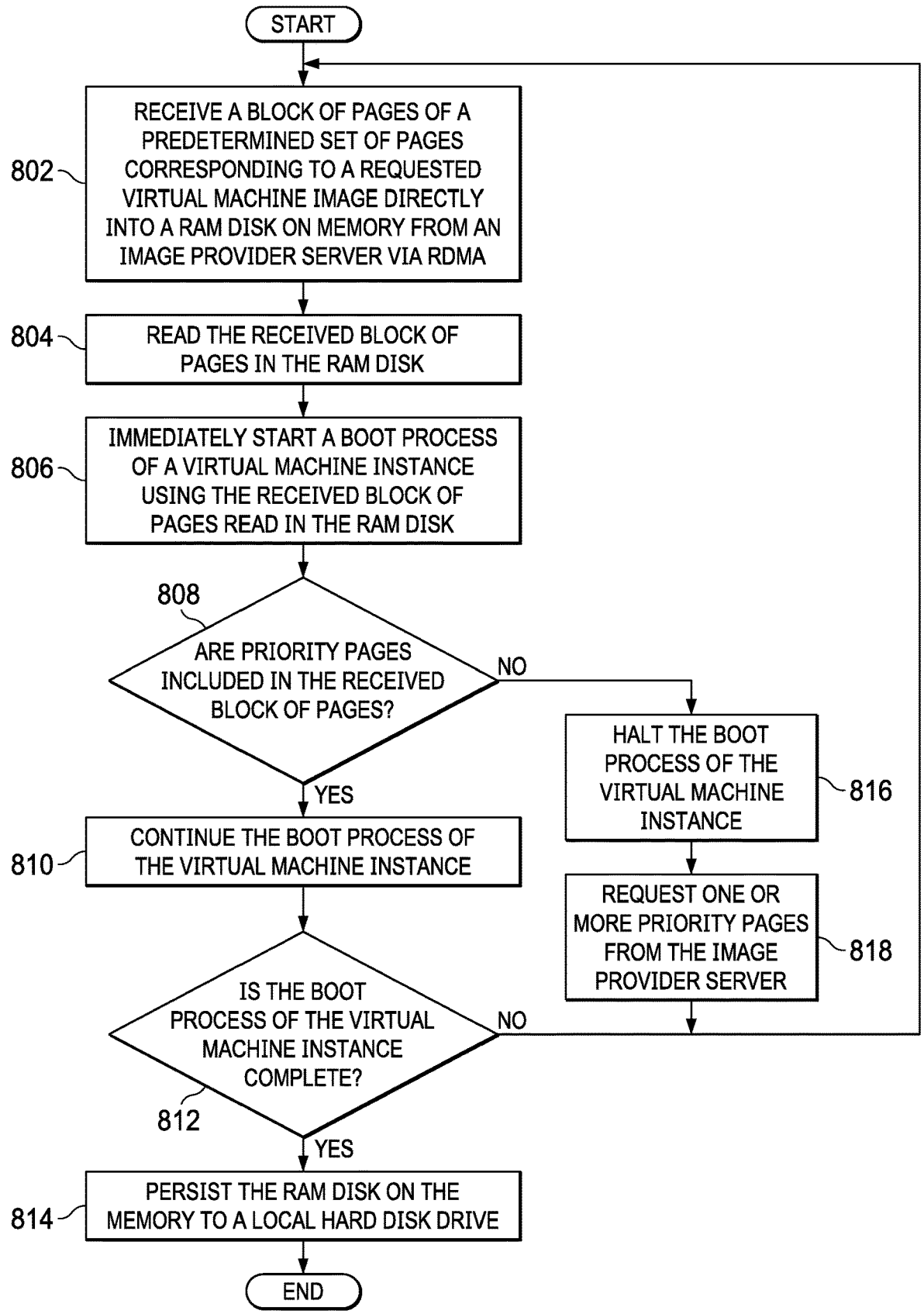
FIG. 8 is a flowchart illustrating a process for booting a virtual machine instance on a host hypervisor server in accordance with an illustrative embodiment.

With reference now to FIG. 8, a flowchart illustrating a process for booting a virtual machine instance on a host hypervisor server is shown in accordance with an illustrative embodiment. The process shown in FIG. 8 may be implemented in a computer, such as, for example, hypervisor server 104 in FIG. 1, data processing system 200 in FIG. 2, a computing node in cloud computing nodes 310 in FIG. 3, host hypervisor server 504 in FIG. 5, or host hypervisor server 604 in FIG. 6.

The process begins when the computer receives a block of pages of a predetermined set of pages corresponding to a requested virtual machine image directly into a RAM disk on memory of the computer from an image provider server via RDMA (step 802). The computer reads the received block of pages in the RAM disk (step 804). In addition, the computer immediately starts a boot process of a virtual machine instance using the received block of pages read in the RAM disk (step 806).

The computer makes a determination as to whether priority pages are included in the received block of pages (step 808). If the computer determines that priority pages are included in the received block of pages, yes output of step 808, then the computer continues the boot process of the virtual machine instance (step 810). Further, the computer makes a determination as to whether the boot process of the virtual machine instance is complete (step 812).

If the computer determines that the boot process of the virtual machine instance is not complete, no output of step 812, then the process returns to step 802 where the computer continues to receive blocks of pages corresponding to the requested virtual machine image from the image provider server. If the computer determines that the boot process of the virtual machine instance is complete, yes output of step 812, then the computer persists the RAM disk on the memory to a local hard disk drive of the computer (step 814). Thereafter, the process terminates.

Returning again to step 808, if the computer determines that priority pages are not included in the received block of pages, no output of step 808, then the computer halts the boot process of the virtual machine instance (step 816). Furthermore, the computer requests one or more priority pages from the image provider server (step 818). Thereafter, the process returns to step 802 where the computer receives the one or more priority pages in one or more blocks of pages corresponding to the requested virtual machine image from the image provider server.

Figure 9:
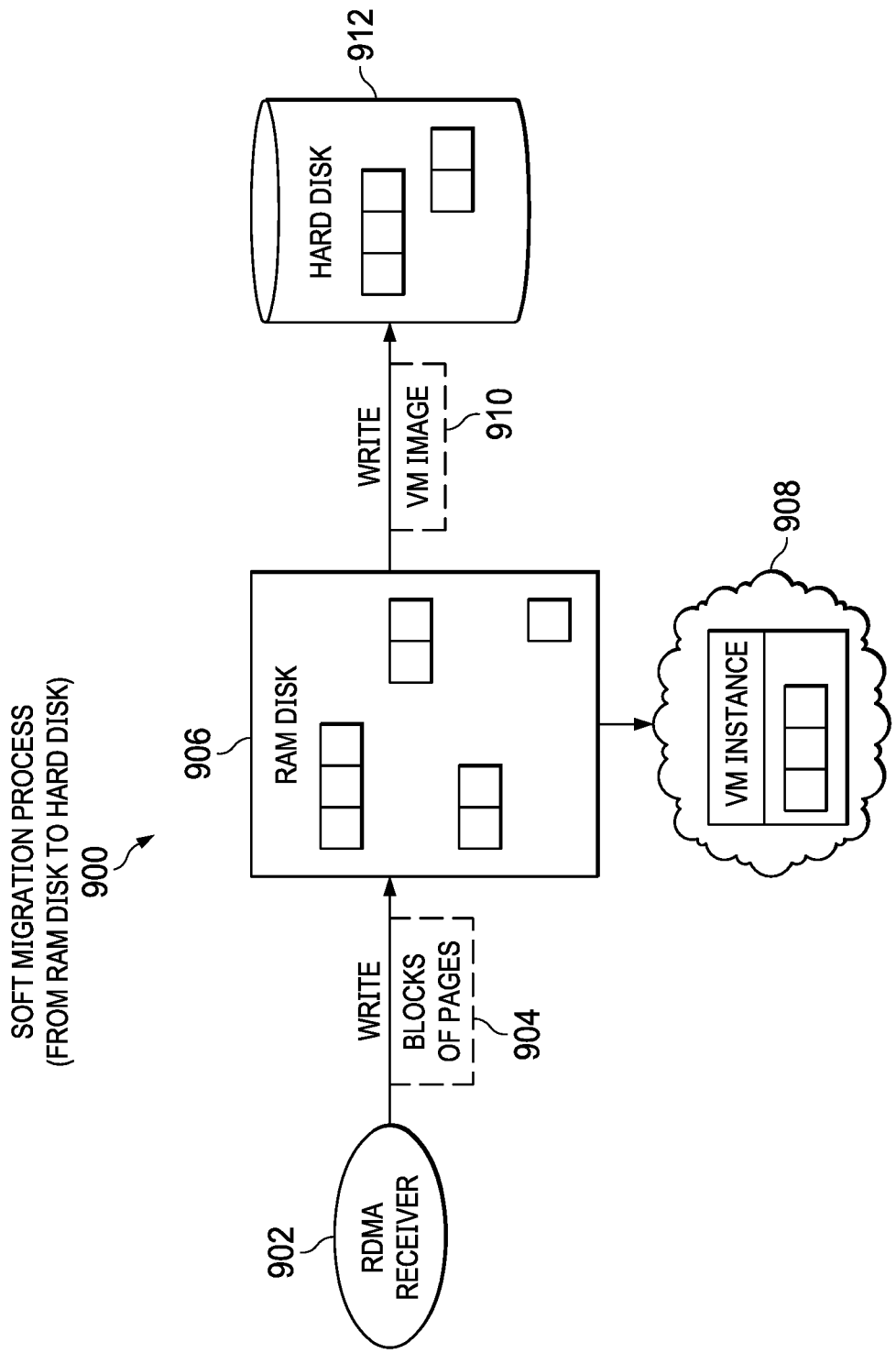
FIG. 9 is a diagram illustrating an example of soft-migration in a host hypervisor server in accordance with an illustrative embodiment.

With reference now to FIG. 9, a diagram illustrating an example of soft-migration in a host hypervisor server is depicted in accordance with an illustrative embodiment. Soft-migration process 900 may be implemented in, for example, host hypervisor server 604 in FIG. 6. Soft-migration process 900 represents a migration of a virtual machine image from RAM disk to hard disk within the host hypervisor server.

In this example, RDMA receiver 902, such as RDMA receiver 626 in FIG. 6, writes blocks of pages 904, which correspond to a virtual machine image, such as virtual machine image 608 in FIG. 6, to RAM disk 906. As initial blocks of pages 904 are written to RAM disk 906, the host hypervisor server instantaneously commences boot of virtual machine instance 908. When boot of virtual machine instance 908 is complete and all of blocks of pages 904 are written to RAM disk 906, soft-migration process 900 writes virtual machine image 910 to hard disk 912 of the host hypervisor server.

Figure 10:
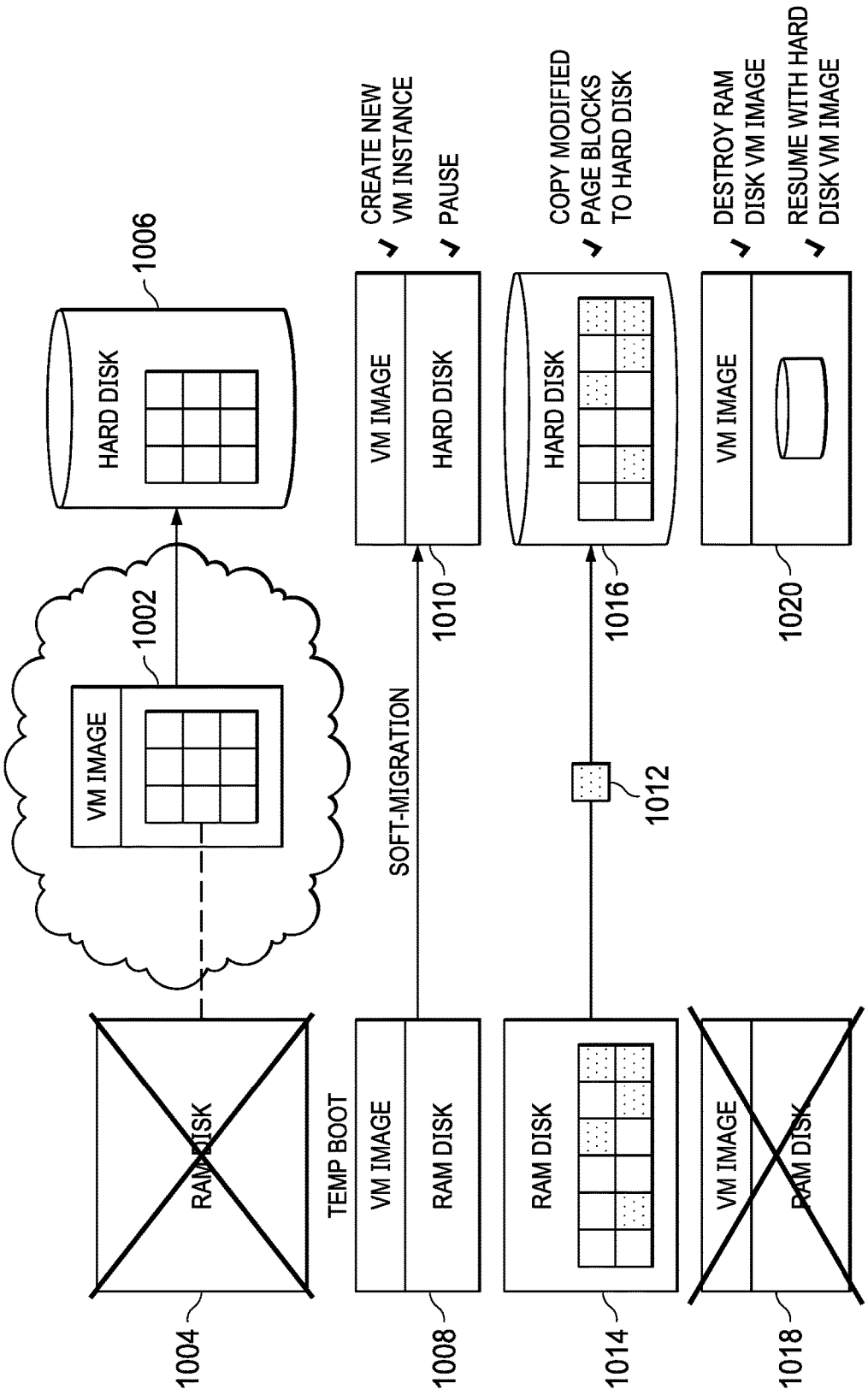
FIG. 10 is a diagram illustrating an example of switching from random-access memory disk to hard disk in a host hypervisor server in accordance with an illustrative embodiment.

With reference now to FIG. 10, a diagram illustrating an example of switching from RAM disk to hard disk in a host hypervisor server is depicted in accordance with an illustrative embodiment. Switching from RAM disk to hard disk process 1000 may be implemented in, for example, host hypervisor server 604 in FIG. 6. Switching from RAM disk to hard disk process 1000 illustrates switching virtual machine image 1002 from RAM disk 1004 to hard disk 1006 of the host hypervisor server.

1008 illustrates the temporary boot of a virtual machine instance using the virtual machine image in RAM disk and soft-migration of the virtual machine image to hard disk at 1010. 1012 illustrates a modified block of pages that is transferred from RAM disk 1014 to hard disk 1016 after initial boot of the virtual machine instance. 1018 illustrates the destruction of the virtual machine image in memory after the virtual machine image is persistently stored in the hard disk at 1020. The host hypervisor server uses the virtual machine image stored in the hard disk to boot future instances of the virtual machine when needed.

Figure 11:
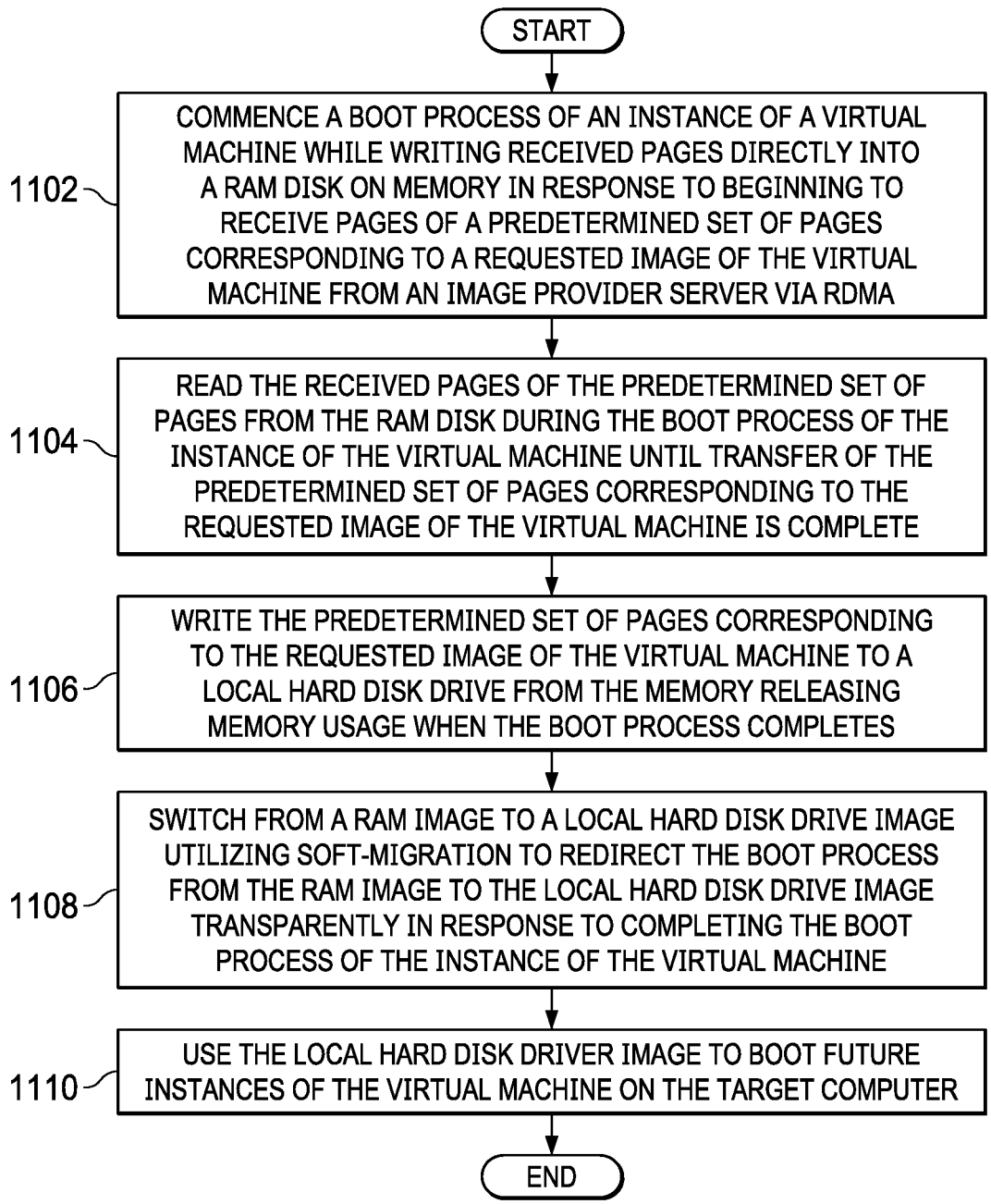
FIG. 11 is a flowchart illustrating a process for instantaneously commencing boot of a virtual machine instance on a host hypervisor server in accordance with an illustrative embodiment.

With reference now to FIG. 11, a flowchart illustrating a process for instantaneously commencing boot of a virtual machine instance on a host hypervisor server is shown in accordance with an illustrative embodiment. The process shown in FIG. 11 may be implemented in a computer, such as, for example, hypervisor server 104 in FIG. 1, data processing system 200 in FIG. 2, a computing node in cloud computing nodes 310 in FIG. 3, host hypervisor server 504 in FIG. 5, or host hypervisor server 604 in FIG. 6.

The process begins when the computer instantaneously commences a boot process of an instance of a virtual machine while writing received pages directly into a RAM disk on memory of the computer in response to the computer beginning to receive pages of a predetermined set of pages corresponding to a requested image of the virtual machine from an image provider server via RDMA (step 1102). The computer reads the received pages of the predetermined set of pages from the RAM disk during the boot process of the instance of the virtual machine until transfer of the predetermined set of pages corresponding to the requested image of the virtual machine is complete (step 1104). The computer also writes the predetermined set of pages corresponding to the requested image of the virtual machine to a local hard disk drive of the computer from the memory releasing memory usage when the boot process completes (step 1106).

In addition, the computer switches from a RAM image to a local hard disk drive image utilizing soft-migration to redirect the boot process from the RAM image to the local hard disk drive image transparently in response to completing the boot process of the instance of the virtual machine (step 1108). The computer uses the local hard disk driver image to boot future instances of the virtual machine on the target computer (step 1110). Thereafter, the process terminates.

Thus, illustrative embodiments of the present invention provide a computer-implemented method, computer system, and computer program product for instantaneously commencing boot of a virtual machine instance on a host hypervisor server using remote direct memory access. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for booting a virtual machine instance using remote direct memory access, the computer-implemented method comprising:

responsive to a computer beginning to receive pages of a predetermined set of pages corresponding to a requested image of a virtual machine from an image provider server, commencing, by the computer, a boot process of an instance of the virtual machine while the computer writes the received pages directly into a random-access memory (RAM) disk on memory of the computer;

reading, by the computer, the received pages of the predetermined set of pages from the RAM disk during the boot process of the instance of the virtual machine until transfer of the predetermined set of pages corresponding to the requested image of the virtual machine is complete;

writing, by the computer, the predetermined set of pages corresponding to the requested image of the virtual machine to a local hard disk drive of the computer from the memory and releasing memory usage; and responsive to the computer completing the boot process of the instance of the virtual machine, switching, by the computer, from a RAM image to a local hard disk drive image.

2. The computer-implemented method of claim 1 further comprising:

destroying, by the computer responsive to the computer completing the boot process of the instance of the virtual machine, the requested image of the virtual machine in the memory; and using, by the computer, the local hard disk drive image to boot a future instance of the virtual machine on the computer.

3. The computer-implemented method of claim 1 further comprising:

receiving, by the computer, an initial first block of pages of the predetermined set of pages corresponding to the requested image of the virtual machine directly into the RAM disk of the computer from the image provider server via remote direct memory access;

reading, by the computer, the received initial first block of pages in the RAM disk; and immediately starting, by the computer, the boot process of the instance of the virtual machine using the received initial first block of pages read in the RAM disk.

4. The computer-implemented method of claim 3 further comprising:

determining, by the computer, whether priority pages are included in the received initial first block of pages;

responsive to the computer determining that priority pages are not included in the received initial first block of pages, halting, by the computer, the boot process of the instance of the virtual machine; and requesting, by the computer, one or more priority pages from the image provider server.

5. The computer-implemented method of claim 4 further comprising:

responsive to the computer determining that priority pages are included in the received initial first block of pages, continuing, by the computer, the boot process of the instance of the virtual machine instance;

determining, by the computer, whether the boot process of the instance of the virtual machine is complete; and responsive to the computer determining that the boot process of the instance of the virtual machine is complete, performing, by the computer, a soft-migration process of the requested image of the virtual machine from the memory to the local hard disk drive of the computer.

6. The computer-implemented method of claim 1, wherein the computer utilizes soft-migration to redirect the boot process from the RAM image to the local hard disk drive image transparently.

7. The computer-implemented method of claim 1, wherein the received pages of the predetermined set of pages contain bootable bits of the requested image.

8. The computer-implemented method of claim 1 further comprising:

sending, by the computer, a request for the requested image to the image provider server via a network.

9. A computer system for booting a virtual machine instance using remote direct memory access, the computer system comprising:

a bus system;

a storage device connected to the bus system, wherein the storage device stores program instructions; and a processor connected to the bus system, wherein the processor executes the program instructions to:

commence a boot process of an instance of a virtual machine while writing received pages directly into a random-access memory (RAM) disk on memory of the computer system in response to beginning to receive pages of a predetermined set of pages corresponding to a requested image of the virtual machine from an image provider server;

read the received pages of the predetermined set of pages from the RAM disk during the boot process of the instance of the virtual machine until transfer of the predetermined set of pages corresponding to the requested image of the virtual machine is complete;

write the predetermined set of pages corresponding to the requested image of the virtual machine to a local hard disk drive of the computer system from the memory releasing memory usage; and switch from a RAM image to a local hard disk drive image in response to completing the boot process of the instance of the virtual machine.

10. The computer system of claim 9, wherein the processor further executes the program instructions to:

responsive to the computer completing the boot process of the instance of the virtual machine, destroy the RAM image of the virtual machine in the memory; and use the local hard disk drive image to boot a future instance of the virtual machine on the computer system.

11. The computer system of claim 9, wherein the processor further executes the program instructions to:

receive an initial first block of pages of the predetermined set of pages corresponding to the requested image of the virtual machine directly into the RAM disk of the computer system from the image provider server via remote direct memory access;

read the received initial first block of pages in the RAM disk; and immediately start the boot process of the instance of the virtual machine using the received initial first block of pages read in the RAM disk.

12. The computer system of claim 11, wherein the processor further executes the program instructions to:

determine whether priority pages are included in the received initial first block of pages;

halt the boot process of the instance of the virtual machine in response to determining that priority pages are not included in the received initial first block of pages; and request one or more priority pages from the image provider server.

13. A computer program product for booting a virtual machine instance using remote direct memory access, the computer program product comprising a computer readable storage medium having program instructions embodied therewith, the program instructions executable by a computer to cause the computer to perform a method comprising:

responsive to the computer beginning to receive pages of a predetermined set of pages corresponding to a requested image of a virtual machine from an image provider server, commencing, by the computer, a boot process of an instance of the virtual machine while the computer writes the received pages directly into a random-access memory (RAM) disk on memory of the computer;

reading, by the computer, the received pages of the predetermined set of pages from the RAM disk during the boot process of the instance of the virtual machine until transfer of the predetermined set of pages corresponding to the requested image of the virtual machine is complete;

writing, by the computer, the predetermined set of pages corresponding to the requested image of the virtual machine to a local hard disk drive of the computer from the memory releasing memory usage; and responsive to the computer completing the boot process of the instance of the virtual machine, switching, by the computer, from a RAM image to a local hard disk drive image.

14. The computer program product of claim 13 further comprising:

destroying, by the computer responsive to the computer completing the boot process of the instance of the virtual machine, the requested image of the virtual machine in the memory; and using, by the computer, the local hard disk drive image to boot a future instance of the virtual machine on the computer.

15. The computer program product of claim 13 further comprising:

receiving, by the computer, an initial first block of pages of the predetermined set of pages corresponding to the requested image of the virtual machine directly into the RAM disk of the computer from the image provider server via the remote direct memory access;

reading, by the computer, the received initial first block of pages in the RAM disk; and immediately starting, by the computer, the boot process of the instance of the virtual machine using the received initial first block of pages read in the RAM disk.

16. The computer program product of claim 15 further comprising:

determining, by the computer, whether priority pages are included in the received initial first block of pages;

responsive to the computer determining that priority pages are not included in the received initial first block of pages, halting, by the computer, the boot process of the instance of the virtual machine; and requesting, by the computer, one or more priority pages from the image provider server.

17. The computer program product of claim 16 further comprising:

responsive to the computer determining that priority pages are included in the received initial first block of pages, continuing, by the computer, the boot process of the instance of the virtual machine instance;

determining, by the computer, whether the boot process of the instance of the virtual machine is complete; and responsive to the computer determining that the boot process of the instance of the virtual machine is complete, performing, by the computer, a soft-migration process of the requested image of the virtual machine from the memory to the local hard disk drive of the computer.

18. The computer program product of claim 13, wherein the computer utilizes soft-migration to redirect the boot process from the RAM image to the local hard disk drive image transparently.

19. The computer program product of claim 13, wherein the received pages of the predetermined set of pages contain bootable bits of the requested image.

20. The computer program product of claim 13 further comprising:

sending, by the computer, a request for the requested image to the image provider server via a network.

* * * * *